(12) United States Patent
Yang (10) Patent No.: US 7,181,973 B2
(45) Date of Patent: Feb. 27, 2007

(54) AIR PUMP WITH A MANOMETER RECEIVED THEREIN

(75) Inventor: Chui-Ching Yang, Shu-Lin (TW)

(73) Assignee: Chuang Yii Enterprise Co., Ltd. (TW)

( * ) Notice: Subject to any disclaimer, the term of this patent is extended or adjusted under 35 U.S.C. 154(b) by 97 days.

(21) Appl. No.: 11/176,381

(22) Filed: Jul. 8, 2005

(65) Prior Publication Data

US 2007/0006643 A1  Jan. 11, 2007

(51) Int. Cl.
*G01L 7/00* (2006.01)
(52) U.S. Cl. ........................................ 73/714
(58) Field of Classification Search ........... 73/700–756
See application file for complete search history.

(56) References Cited

U.S. PATENT DOCUMENTS 3,855,999 A * 12/1974 Arroyo ...................... 600/497
4,380,933 A * 4/1983 Irvin ............................ 73/749
5,636,547 A * 6/1997 Raj et al. ...................... 73/299
5,734,109 A * 3/1998 Thanscheidt .................. 73/744

* cited by examiner

*Primary Examiner*—Edward Lefkowitz
*Assistant Examiner*—Jermaine Jenkins
(74) *Attorney, Agent, or Firm*—Hershkovitz & Associates; Abe Hershkovitz (57) ABSTRACT

An air pump includes a cylindrical casing, a manometer movably received in the cylindrical casing to be selectively extended out of the cylindrical casing, an air duct securely received in the manometer to be firmly engaged with an inner face defining the reduced bottom opening of the cylindrical casing, a tube to be received inside the manometer, a rod having an annular groove to receive therein a second O ring, a recoil spring mounted outside the manometer. Therefore, when the first O ring is moved upward relative to a downward movement of the manometer to abut a top periphery of the groove, air inside a space defined by the manometer and cylindrical casing is able to flow through a gap between the manometer and the tube and into the air duct via a channel in the rod and into an object to be inflated.

12 Claims, 8 Drawing Sheets

AIR PUMP WITH A MANOMETER RECEIVED THEREIN

BACKGROUND OF THE INVENTION

1. Field of the Invention

The present invention relates to an air pump, and more particularly to an air pump with a manometer movably received therein to indicate pressure within an object being inflated by the air pump.

2. Description of Related Art

A conventional air pump has only one function, i.e. to inflate an object. During the inflating process, the operator does not have an accurate understanding of how much pressure has been built up inside the object such that the operator has to use a manometer to measure the pressure inside the object. That is, the operator has to prepare two isolated elements to complete the inflating process and to measure the pressure within the object.

To overcome the shortcomings, the present invention tends to provide an improved air pump to mitigate the aforementioned problems.

SUMMARY OF THE INVENTION

The primary objective of the present invention is to provide an improved air pump having therein a manometer.

In one aspect of the present invention, the manometer is movably received inside the air pump such that air outside the object is able to be pumped into the object via a linear movement of the manometer.

In order to accomplish the aforementioned objectives, the air pump of the present invention includes a hollow cylindrical casing, a hollow cover mounted on a top opening of the cylindrical casing, a manometer movably received inside the cylindrical casing and having indexes formed on an outer periphery of the manometer, an air duct received inside the manometer to be firmly engaged with a periphery defining a bottom opening of the cylindrical casing, a recoil spring mounted outside the manometer and having a top end abutted to a bottom face of the hollow cover and a bottom end abutted to the periphery defining the bottom opening of the cylindrical casing such that pressure inside the object to be inflated is able to push the manometer upward relative to the cylindrical casing and a downward movement of the manometer is able to force air inside the cylindrical casing into the object.

A further aspect of the present invention is that a cutout is defined in a bottom periphery of the manometer so that an upward movement of the manometer is able to allow air outside the air pump to flow into the air pump.

Other objects, advantages and novel features of the invention will become more apparent from the following detailed description when taken in conjunction with the accompanying drawings.

DETAILED DESCRIPTION OF THE PREFERRED EMBODIMENT

Figure 1:
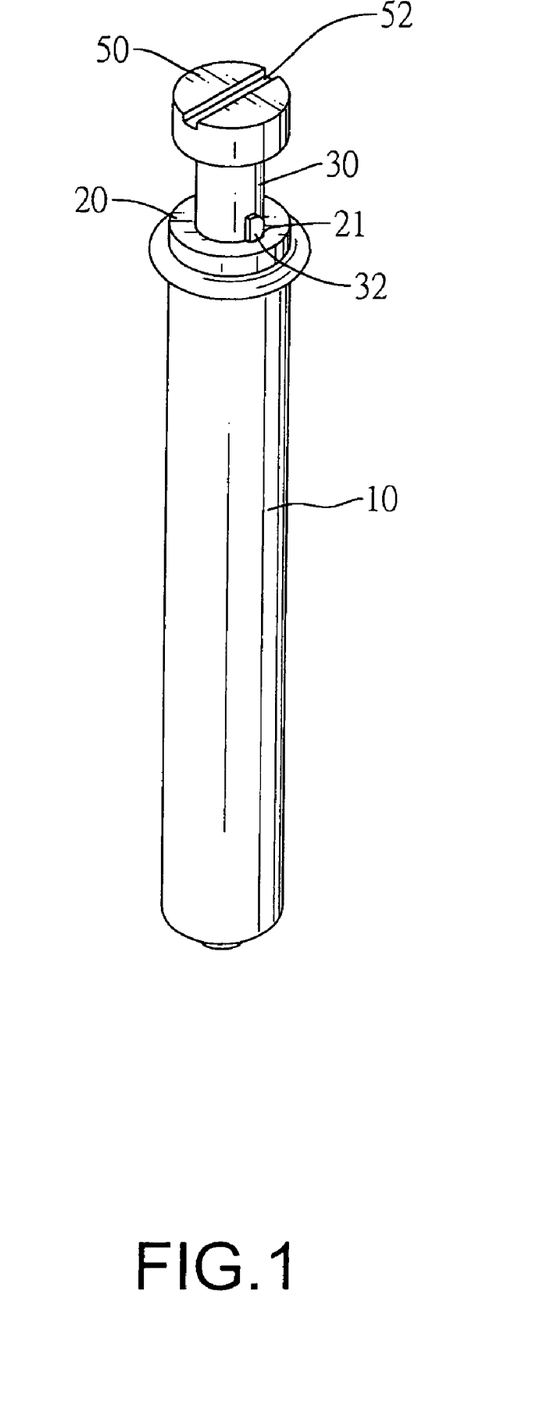
FIG. 1 is a perspective view of the air pump of the present invention.
Figure 2:
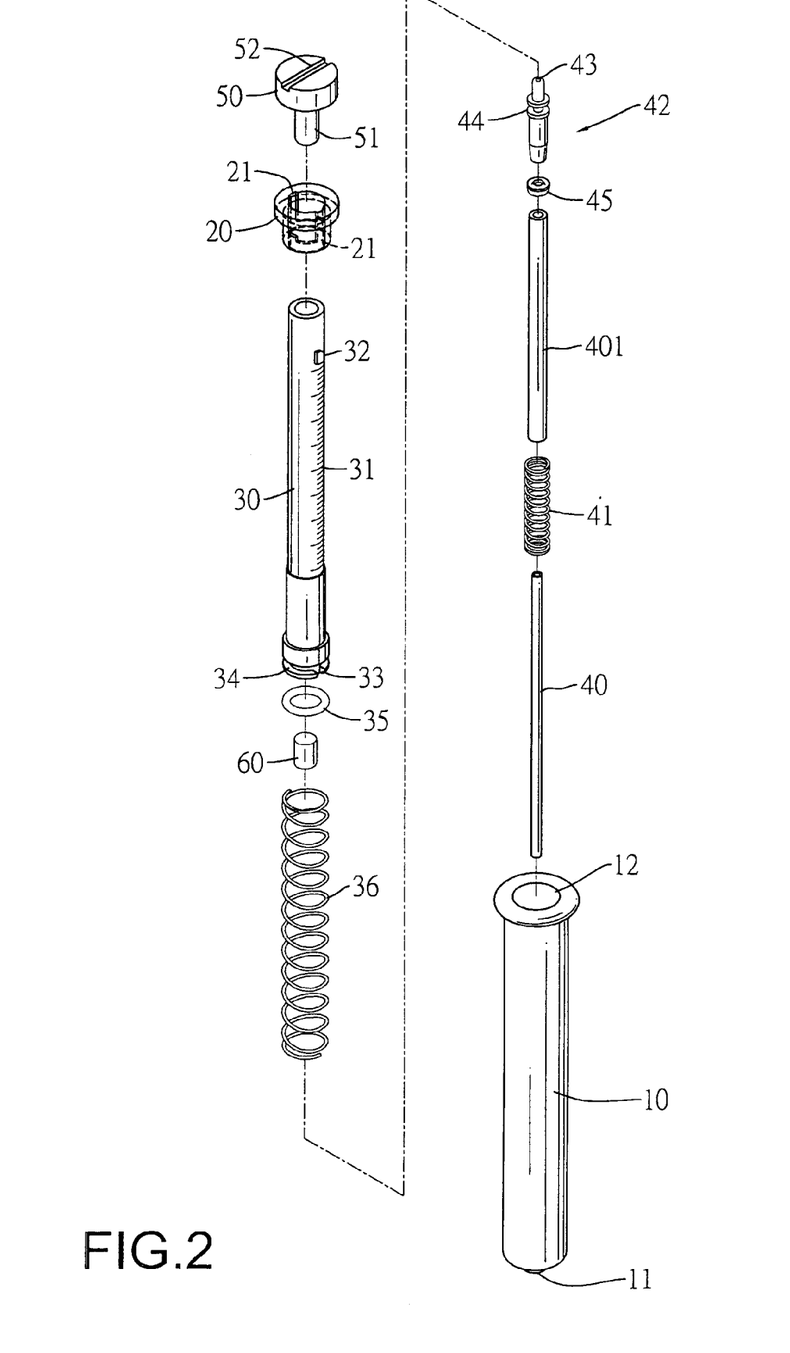
FIG. 2 is an exploded perspective view of the air pump shown in FIG. 1.

With reference to FIGS. 1 and 2, it is noted that the air pump in accordance with the present invention includes a hollow cylindrical casing (10), a hollow cover (20), a manometer (30), an air duct (40), a nozzle plug (50) and a plug (60).

The cylindrical casing (10) has a reduced bottom opening (11) and a top opening (12) in communication with the bottom opening (11). The hollow cover (20) is mounted in the top opening (12) of the cylindrical casing (10) and has two slits (21) longitudinally defined in an inner periphery of the hollow cover (20). The manometer (30) is movably received inside the cylindrical casing (10) and has an index (31) formed on an outer periphery of the manometer (30), two bosses (32) formed on the outer periphery thereof to correspond to the slits (21) of the hollow cover (20), a groove (34) annularly defined in the outer periphery in the bottom portion of the manometer (30) to movably receive therein a first O ring (35) and a cutout (33) defined in a bottom periphery defining groove (34).

The air duct (40) is provided with a top opening and a bottom opening. A bottom portion of the air duct (40) is firmly engaged with an inner periphery defining the reduced bottom opening (11) of the cylindrical casing (10). A tube (401) is provided to receive therein the air duct (40) and a spring (41) has a top end securely engaged with an inner periphery in the bottom portion of the manometer (30) and a bottom end securely abutted to an inner periphery defining the reduced bottom opening (11) of the cylindrical casing (10). A rod (42) is securely mounted in a top opening of the air duct (40) and has a channel (43) defined through the rod (42) to communicate with an interior of the air duct (40) and an annular groove (44) defined in an outer periphery thereof to receive therein a second O ring (45).

The nozzle plug (50) is provided with an extension (51) extending into the hollow cover (20) to be firmly engaged with the top opening of the manometer (30) and a recess (52) defined in a top face thereof. The plug (60) is securely received inside the manometer (30) to engage with the rod (42). A recoil spring (36) is mounted outside the manometer (30) and has a top end abutted to a bottom face of the hollow cover (20) and a bottom end abutted to the periphery defining the reduced bottom opening (11) of the cylindrical casing (10).

With reference to FIGS. 2 and 3 again, when the air pump of the present invention is used, the air pump is entirely and securely received in the object (70) to be inflated and the nozzle plug (50) as well as the manometer (30) is kept down inside the object due to the boss (32) being abutted by a bottom periphery of the hollow cover (20). That is, the nozzle plug (50) is flush with an outer periphery of the object (70). Thus, in use, the operator is able to use an auxiliary tool such as a screwdriver to extend into the recess (52) and to rotate the nozzle plug (50) as well as the manometer (30) due to secured engagement between the nozzle plug (50) and the manometer (30). After the nozzle plug (50) and the manometer (30) are rotated, the bosses (32) are released from the bottom periphery of the hollow cover (20) and aligned with the slits (21) of the hollow cover (20). Therefore, the two bosses (32) are able to slide along the two slits (21) to enable the manometer (30) as well as the nozzle plug (50) to extend out of the outer periphery of the object (70) due to recoil force from the spring (41), a shown in FIGS. 4, 5 and 6. After the manometer (30) is extended out of the outer periphery of the object (70), balance between the atmosphere and the recoil force of the recoil spring (36) results in the manometer (30) protruding from the outer periphery of the object (70). Therefore, the operator is able to know the pressure inside the object (70) from the reading of the index (31).

Figure 4:
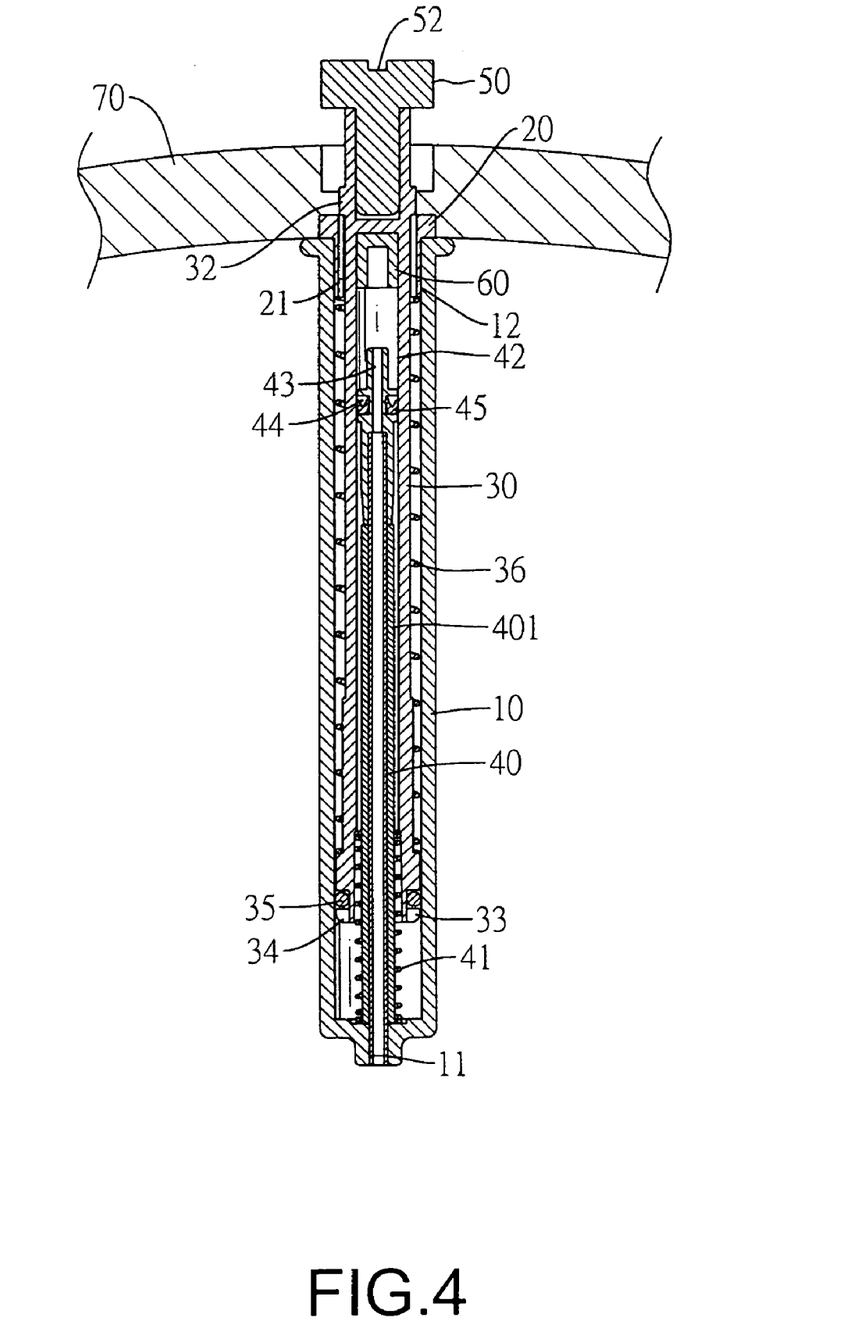
FIG. 4 is a cross sectional view showing that the nozzle plug is lifted by the recoil spring after the manometer is rotated to be released from the hollow cover.
Figure 5:
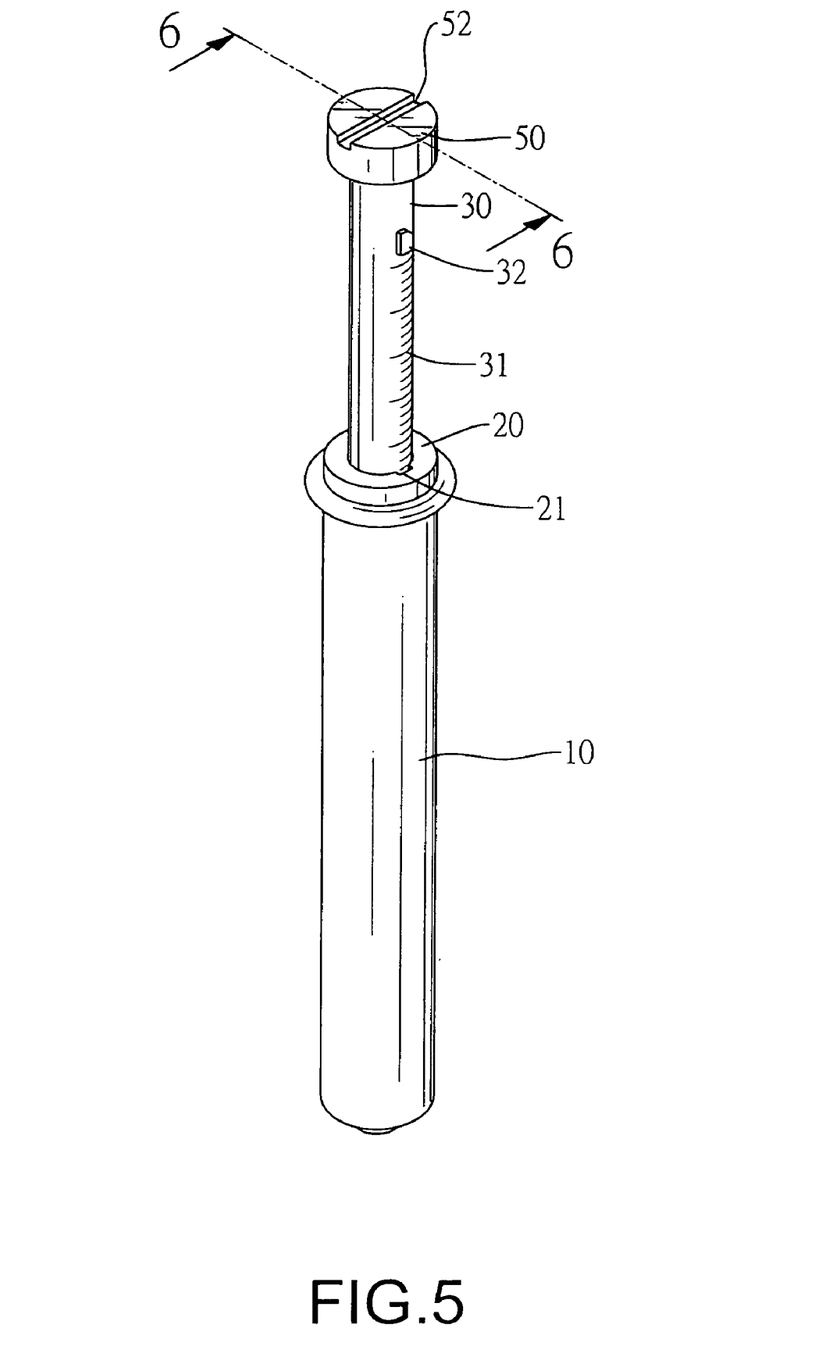
FIG. 5 is a perspective view showing that the air pump is ready for application.
Figure 6:
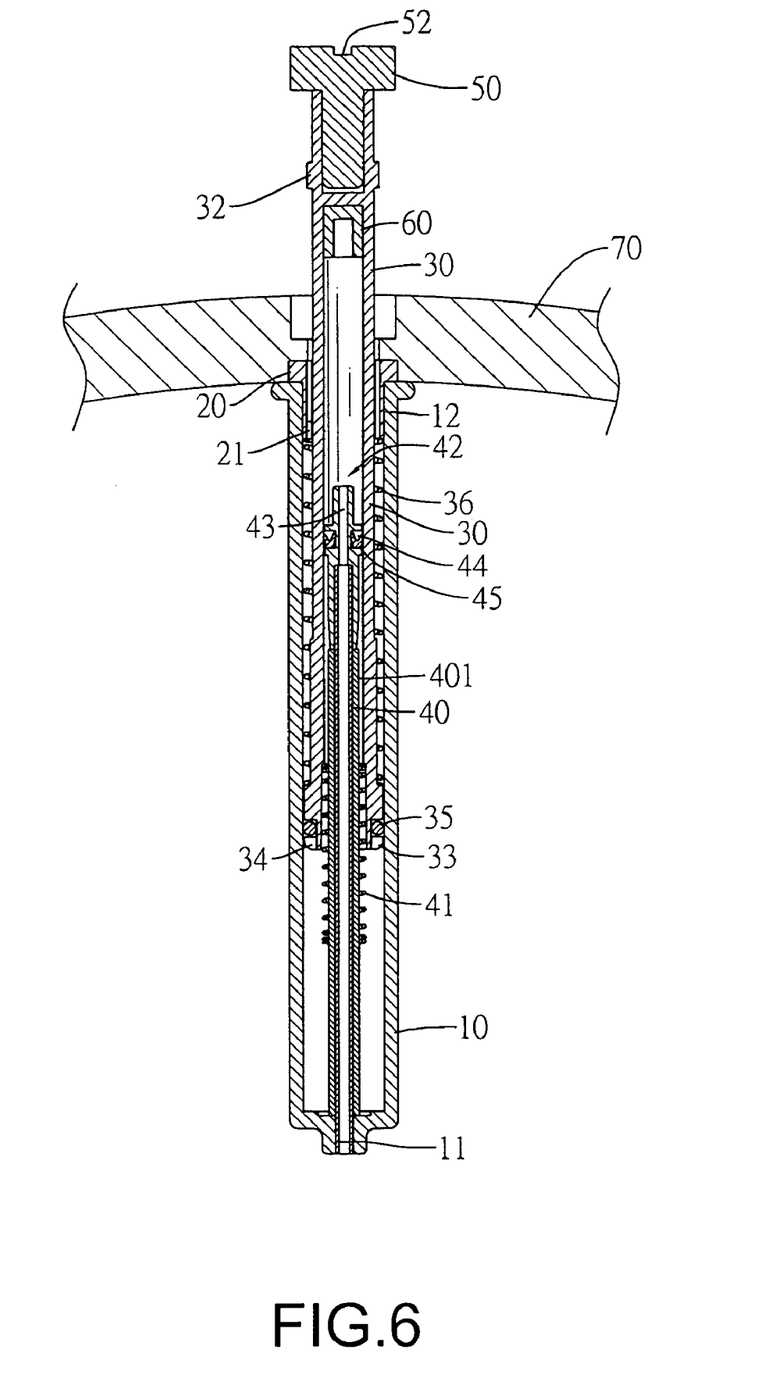
FIG. 6 is a cross sectional view of the air pump in FIG. 5.

Taking FIGS. 4 and 6 for reference, if the pressure inside the object is insufficient, the operator is able to push the manometer (30) downward into the object (70). Meanwhile, the first O ring (35) is moved upward relative to the downward movement of the manometer (30) to abut a top periphery of the groove (34). Thus air inside a space defined by the manometer (30) and cylindrical casing (10) is able to flow in a gap between the manometer (30) and the tube (401) and into the air duct (40) via the channel (43) of the rod (42). Eventually, the air is able to be forced into the object (70) to inflate the object (70). When the manometer (30) is extended (pulled) out of the cylindrical casing (10), air outside the object (70) is able to flow through the hollow cover (20), an upper portion of a space between the manometer (30) and the cylindrical casing (10) divided by the first O ring (35), the cutout (33) and into a lower portion of the space defined by the manometer (30) and the cylindrical casing (10) to be ready for a subsequent inflating process.

Figure 7:
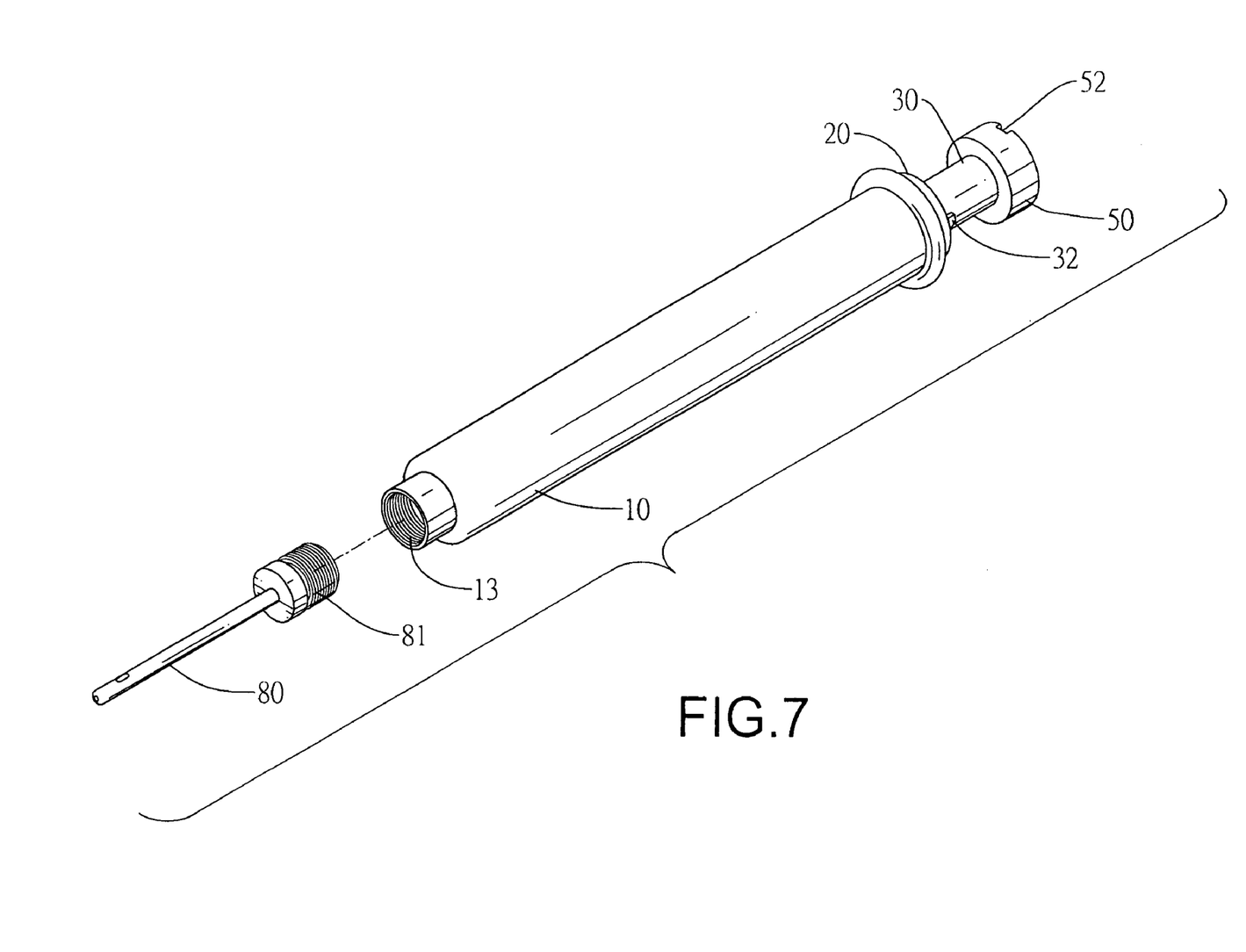
FIG. 7 is a perspective view of a different embodiment of the air pump to be used with a needle.
Figure 8:
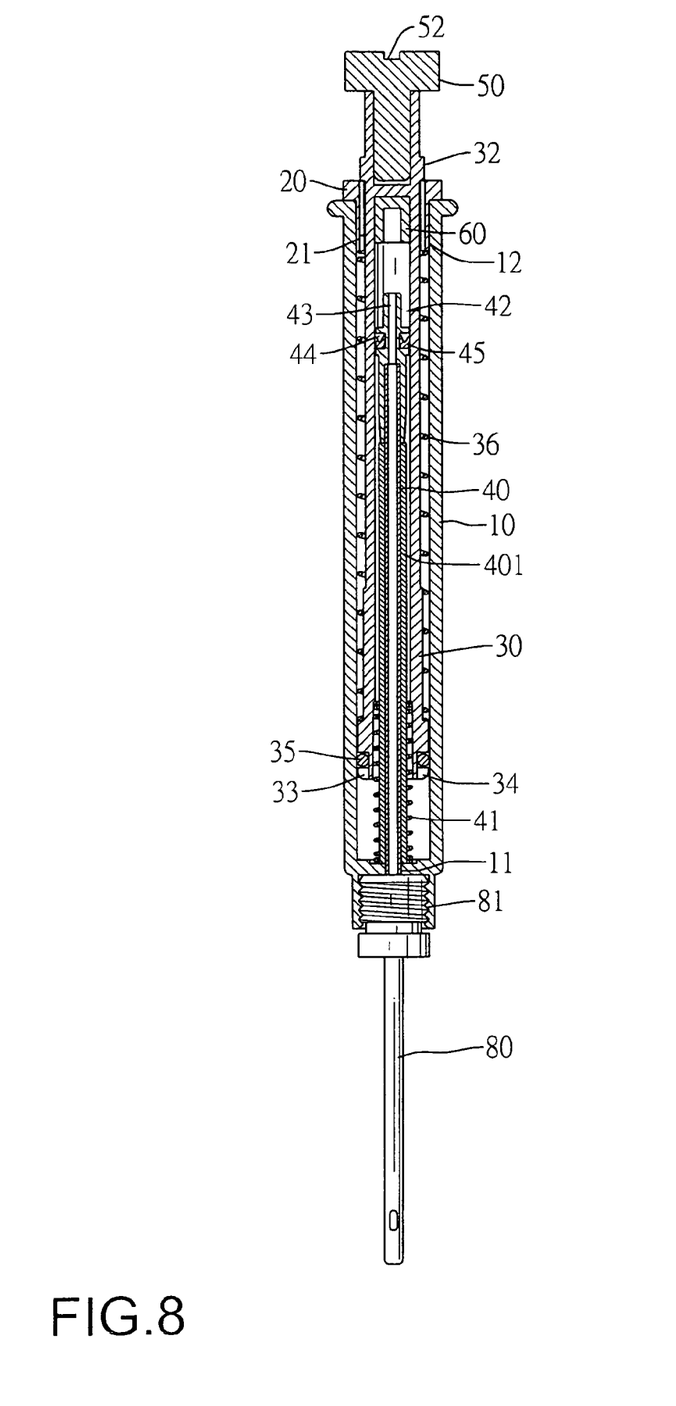
FIG. 8 is a cross sectional view showing the combination of the embodiment in FIG. 7.

With reference to FIGS. 7 and 8, it is noted that the embodiment as shown is substantially the same as that described earlier. The only difference therebetween is that the inner face defining the reduced bottom opening (11) of the cylindrical casing (10) is provided with an inner threading (13) so that a needle (80) having an outer threading (81) formed thereon is able to be threadingly connected to the reduced bottom opening (11) of the cylindrical casing (10) by mating the outer threading (81) with the inner threading (13). Therefore, the operator is able to use the air pump of the present invention with the needle (80) connected thereto to inflate the object exteriorly.

Figure 3:
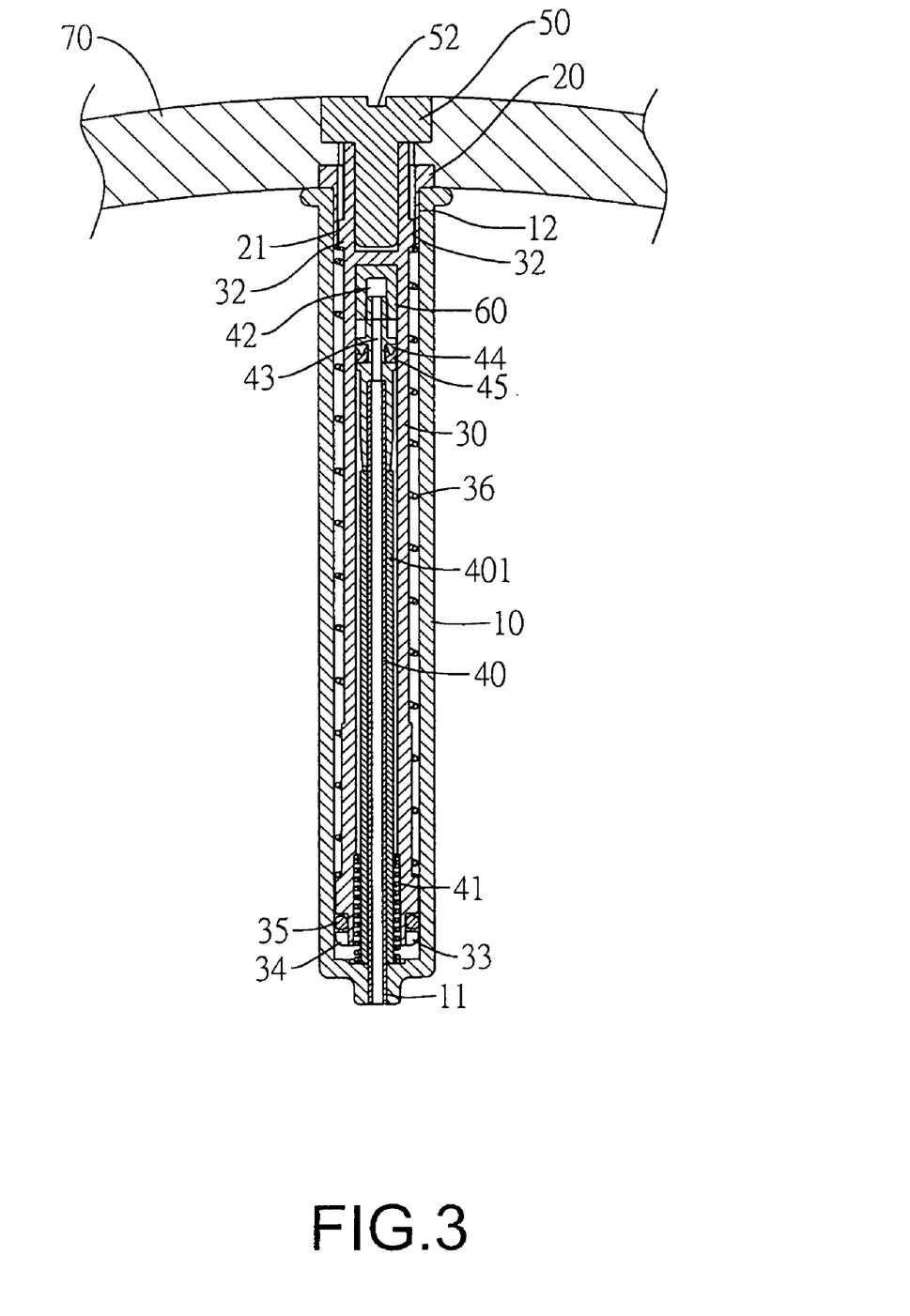
FIG. 3 is a cross sectional view showing the combination of components of the air pump and the application thereof.

From the description, it is noted that the recoil force from the spring (41) is able to urge the bosses (32) of the manometer (30) to abut the bottom face of the hollow cover (20) so as to maintain the manometer (30) as well as the nozzle plug (50) concealed inside the object (70), as shown in FIG. 3. However, after the nozzle plug (50) is rotated to release the bosses (32) from abutment to the bottom face of the hollow cover (20), the recoil force ejects the manometer (30) for use.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air pump comprising:
   a hollow cylindrical casing having a reduced bottom opening and a top opening;
   a hollow cover mounted in the top opening of the cylindrical casing;
   a manometer movably received in the cylindrical casing to be selectively extended out of the cylindrical casing and having a groove defined in an outer periphery thereof to movably receive therein a first O ring and a cutout defined in a bottom face defining the groove;
   an air duct securely received in the manometer to be firmly engaged with an inner face defining the reduced bottom opening of the cylindrical casing;
   a tube provided to receive therein the air duct and to be received inside the manometer;
   a rod firmly mounted in a top opening of the tube and having an annular groove defined in an outer periphery to receive therein a second O ring; and
   a recoil spring mounted outside the manometer and having a top end abutted to a bottom face of the hollow cover and a bottom end abutted to the inner face defining the reduced bottom opening of the cylindrical casing such that in a situation where the first O ring is moved upward relative to a downward movement of the manometer to abut a top periphery of the groove, air inside a space defined by the manometer and cylindrical casing is able to flow through a gap between the manometer and the tube and into the air duct via a channel in the rod and into an object to be inflated, and in a situation where the manometer is extended out of the cylindrical casing, ambient air is able to flow through the hollow cover, an upper portion of a space between the manometer and the cylindrical casing divided by the first O ring, the cutout and into a lower portion of the space defined by the manometer and the cylindrical casing to be ready for a subsequent inflating process.

2. The air pump as claimed in claim 1, wherein the manometer has bosses formed on an outer periphery thereof and the hollow cover has slits defined in an inner face thereof so that when the bosses are abutted to a bottom face of the hollow cover, the manometer is concealed inside the object and when the bosses are aligned with the slits after a nozzle plug which is firmly engaged with the manometer is rotated, the manometer is extended outside the object such that the manometer is ready for use.

3. The air pump as claimed in claim 2, wherein the nozzle plug has a recess defined in a top face thereof to facilitate rotation of the nozzle plug.

4. The air pump as claimed in claim 1 further comprising a spring having a top end securely engaged with an inner periphery in a bottom portion of the manometer and a bottom end securely abutted to an inner periphery defining the reduced bottom opening of the cylindrical casing to rise the manometer out of the cylindrical casing after the nozzle plug is rotated.

5. The air pump as claimed in claim 2 further comprising a spring having a top end securely engaged with an inner periphery in a bottom portion of the manometer and a bottom end securely abutted to an inner periphery defining the reduced bottom opening of the cylindrical casing to eject the manometer from the cylindrical casing after the nozzle plug is rotated.

6. The air pump as claimed in claim 3 further comprising a spring having a top end securely engaged with an inner periphery in a bottom portion of the manometer and a bottom end securely abutted to an inner periphery defining the reduced bottom opening of the cylindrical casing to eject the manometer from the cylindrical casing after the nozzle plug is rotated to align the bosses with the slits.

7. The air pump as claimed in claim 1, wherein the reduced bottom opening of the cylindrical casing is provided with an inner threading formed on an inner face defining the reduced bottom opening for mating with an outer threading of a needle.

8. The air pump as claimed in claim 2, wherein the reduced bottom opening of the cylindrical casing is provided with an inner threading formed on an inner face defining the reduced bottom opening for mating with an outer threading of a needle.

9. The air pump as claimed in claim 3, wherein the reduced bottom opening of the cylindrical casing is provided with an inner threading formed on an inner face defining the reduced bottom opening for mating with an outer threading of a needle.

10. The air pump as claimed in claim 4, wherein the reduced bottom opening of the cylindrical casing is provided with an inner threading formed on an inner face defining the reduced bottom opening for mating with an outer threading of a needle.

11. The air pump as claimed in claim 5, wherein the reduced bottom opening of the cylindrical casing is provided with an inner threading formed on an inner face defining the reduced bottom opening for mating with an outer threading of a needle.

12. The air pump as claimed in claim 6, wherein the reduced bottom opening of the cylindrical casing is provided with an inner threading formed on an inner face defining the reduced bottom opening for mating with an outer threading of a needle.

* * * * *